(12) United States Patent  (10) Patent No.: US 8,488,285 B2
Divan  (45) Date of Patent: Jul. 16, 2013

(54) ACTIVE CURRENT SURGE LIMITERS WITH WATCHDOG CIRCUIT

(75) Inventor: Deepakraj Malhar Divan, San Jose, CA (US)

(73) Assignee: Georgia Tech Research Corporation, Atlanta, GA (US)

( * ) Notice: Subject to any disclaimer, the term of this patent is extended or adjusted under 35 U.S.C. 154(b) by 70 days.

(21) Appl. No.: 13/230,319

(22) Filed: Sep. 12, 2011

(65) Prior Publication Data

US 2012/0063042 A1    Mar. 15, 2012

Related U.S. Application Data

(63) Continuation of application No. 11/815,041, filed as application No. PCT/US2005/038471 on Oct. 24, 2004, now Pat. No. 8,035,938.

(51) Int. Cl.
*H02H 9/00* (2006.01)

(52) U.S. Cl.
USPC .......................................................... 361/58

(58) Field of Classification Search
USPC .......................................................... 361/58
See application file for complete search history.

(56) References Cited

U.S. PATENT DOCUMENTS

| | | |
|---|---|---|
| 3,109,930 A | 11/1963 | MacDonald |
| 3,558,952 A | 1/1971 | Forbes |
| 3,935,511 A * | 1/1976 | Boulanger et al. ............. 361/58 |
| 3,935,527 A | 1/1976 | Michelet et al. |
| 4,031,463 A | 6/1977 | Norberg |
| 4,250,531 A | 2/1981 | Ahrens |
| 4,328,459 A | 5/1982 | McLeod, Jr. |
| 4,396,882 A | 8/1983 | Kellenbenz |
| 4,479,118 A | 10/1984 | Cole, Jr. |
| 4,555,741 A | 11/1985 | Masaki |
| 4,560,887 A | 12/1985 | Schneider |
| 4,675,772 A | 6/1987 | Epstein |
| 4,691,274 A | 9/1987 | Matouk et al. |
| 4,782,241 A | 11/1988 | Baker et al. |
| 4,924,342 A | 5/1990 | Lee |
| 4,939,437 A | 7/1990 | Farag et al. |
| 5,030,844 A | 7/1991 | Li et al. |
| 5,032,738 A | 7/1991 | Vithayathil |

(Continued)

FOREIGN PATENT DOCUMENTS

| | | |
|---|---|---|
| EP | 0 708 515 A1 | 4/1996 |
| EP | 0 986 158 A1 | 3/2000 |

(Continued)

OTHER PUBLICATIONS

Int'l Search Rpt & WO, Mar. 13, 2006, Int'l Searching Authority.

(Continued)

*Primary Examiner* — Stephen W Jackson
*Assistant Examiner* — Angela Brooks
(74) *Attorney, Agent, or Firm* — Morris, Manning & Martin, LLP; John R. Harris

(57) ABSTRACT

Active current surge limiters and methods of use are disclosed. One exemplary system, among others, comprises a current limiter, including an interface configured to be connected between a power supply and a load; a disturbance sensor, configured to monitor the power supply for a disturbance during operation of the load; and an activator, configured to receive a control signal from the disturbance sensor and to activate the current limiter based on the control signal.

39 Claims, 6 Drawing Sheets

U.S. PATENT DOCUMENTS

| | | | |
|---|---|---|---|
| 5,063,303 | A | 11/1991 | Sackman et al. |
| 5,257,157 | A | 10/1993 | Epstein |
| 5,379,177 | A | 1/1995 | Bird |
| 5,386,183 | A | 1/1995 | Cronvich et al. |
| 5,448,442 | A | 9/1995 | Farag et al. |
| 5,519,264 | A | 5/1996 | Heyden et al. |
| 5,519,295 | A | 5/1996 | Jatnieks |
| 5,537,021 | A | 7/1996 | Weinberg et al. |
| 5,563,459 | A | 10/1996 | Kurosawa et al. |
| 5,619,127 | A | 4/1997 | Warizaya |
| 5,627,738 | A | 5/1997 | Lubomirsky et al. |
| 5,642,007 | A | 6/1997 | Gyugyi et al. |
| 5,689,395 | A * | 11/1997 | Duffy et al. ............ 361/93.6 |
| 5,737,161 | A | 4/1998 | Thomas |
| 5,745,322 | A | 4/1998 | Duffy et al. |
| 5,864,458 | A | 1/1999 | Duffy et al. |
| 5,886,429 | A | 3/1999 | Grady et al. |
| 5,894,396 | A | 4/1999 | Kim |
| 5,907,192 | A | 5/1999 | Lyons et al. |
| 6,005,362 | A | 12/1999 | Enjeti et al. |
| 6,021,035 | A | 2/2000 | Larsen et al. |
| 6,046,921 | A | 4/2000 | Tracewell et al. |
| 6,112,136 | A | 8/2000 | Paul et al. |
| 6,118,676 | A | 9/2000 | Divan et al. |
| 6,178,080 | B1 | 1/2001 | Wilken et al. |
| 6,184,593 | B1 | 2/2001 | Jungreis |
| 6,456,097 | B1 | 9/2002 | Sutherland |
| 6,538,864 | B2 | 3/2003 | Mullner |
| 6,597,144 | B2 | 7/2003 | Pearson et al. |
| 6,744,612 | B2 | 6/2004 | Chen |
| 6,744,613 | B2 | 6/2004 | McCook et al. |
| 6,862,201 | B2 | 3/2005 | Hodge, Jr. |
| 7,012,793 | B2 | 3/2006 | Cheevanantachai et al. |
| 7,049,710 | B2 | 5/2006 | Dahlman |
| 7,099,135 | B2 | 8/2006 | Ball et al. |
| 7,184,279 | B2 | 2/2007 | Lee |
| 7,355,294 | B2 | 4/2008 | Teichmann |
| 7,504,821 | B2 | 3/2009 | Shuey |
| 7,525,777 | B2 | 4/2009 | Aromin |
| 7,541,696 | B2 | 6/2009 | Dawley |
| 7,630,185 | B2 | 12/2009 | Fiesoli et al. |
| 7,957,117 | B2 | 6/2011 | Divan et al. |
| 7,977,928 | B2 | 7/2011 | Farenbruch |
| 8,035,938 | B2 * | 10/2011 | Divan ............................ 361/58 |
| 2001/0021091 | A1 | 9/2001 | Weichler |
| 2002/0012261 | A1 | 1/2002 | Moindron |
| 2002/0122318 | A1 | 9/2002 | Guerrera |
| 2002/0149891 | A1 | 10/2002 | Neiger et al. |
| 2003/0107859 | A1 | 6/2003 | Pan et al. |
| 2003/0222747 | A1 | 12/2003 | Perkinson et al. |
| 2004/0201931 | A1 | 10/2004 | Korcharz et al. |
| 2005/0088792 | A1 | 4/2005 | Mechanic et al. |
| 2010/0091421 | A1 * | 4/2010 | Lee ............................ 361/93.8 |

FOREIGN PATENT DOCUMENTS

| | | |
|---|---|---|
| FR | 2 197 258 | 3/1974 |
| GB | 1076078 | 7/1967 |
| GB | 2284100 | 5/1995 |
| JP | 61-77634 | 5/1986 |
| JP | 05-049167 | 2/1993 |
| JP | 2001-136657 | 5/2001 |
| JP | 2003-259648 | 9/2003 |
| JP | 2004-304876 | 10/2004 |
| WO | WO 00/59087 A1 | 10/2000 |

OTHER PUBLICATIONS

Duran-Gomez, Jose Luis, et al., An Approach to Achieve Ride-Through of an Adjustable-Speed Drive with Flyback Converter Modules Powered by Super Capacitors, IEEE Transactions on Industry Applications, Mar./Apr. 2002, pp. 514-522, vol. 38, No. 2, IEEE, USA.

Electrotek, Voltage Sag Studies, http://www.electrotek.com/voltsag.htm, Feb. 16, 2006, pp. 1-5, Electrotek Concepts, USA.

Fischer, F. V., Applied Power Electronics in the Field of Voltage Dip-Proofing, http://www.measurlogic.com/Resources/PowerQuality_book.pdf, May 16, 2002, pp. 1-12, Dip-Proofing Technologies Inc., USA.

Stratford, J., et al., Applying Voltage Dip Proofing to Provide Ride-Through, http://www.electricenergyonline.com/?page=show_article&mag=11&article=81, Feb. 2003, pp. 1-8, Electric Energy Publications Inc., USA.

\* cited by examiner

ACTIVE CURRENT SURGE LIMITERS WITH WATCHDOG CIRCUIT

CROSS-REFERENCE TO RELATED APPLICATIONS

This application is a continuation of U.S. patent application Ser. No. 11/815,041, filed Sep. 2, 2008, entitled "ACTIVE CURRENT SURGE LIMITERS," by Deepakraj Divan, now U.S. Pat. No. 8,035,938, which is a 35 U.S.C. §371 national stage application of and claims priority to international application No. PCT/US2005/038471, filed Oct. 24, 2005, and also claims the benefit pursuant to §119(e) of and priority to U.S. Provisional Patent Application No. 60/648,466, filed on Jan. 31, 2005, entitled "System and Method for Determining Power System Transmission Line Information", the disclosures of which are incorporated herein by reference in their entireties.

This application is also related to and incorporates herein by reference each of the following patent applications:

U.S. patent application Ser. No. 13/230,190, filed Sep. 12, 2011, entitled "ACTIVE CURRENT SURGE LIMITERS WITH DISTURBANCE SENSOR AND MULTISTAGE CURRENT LIMITING."

U.S. patent application Ser. No. 13/230,251, filed Sep. 12, 2011, entitled "ACTIVE CURRENT SURGE LIMITERS WITH VOLTAGE DETECTOR AND RELAY."

U.S. patent application Ser. No. 13/230,346, filed Sep. 12, 2011, entitled "ACTIVE CURRENT SURGE LIMITERS WITH INRUSH CURRENT ANTICIPATION."

TECHNICAL FIELD

The present disclosure is generally related to limiting current surge and, more particularly, embodiments of the present disclosure are related to actively limiting surge current produced by power supply disturbances during load operation.

BACKGROUND

There are many applications where it is necessary to protect electrical equipment from power surges and high energy transients that could damage or adversely affect the operation of such equipment. Voltage surges are commonly perceived to be the most common cause for damage to electrical equipment during operation. Voltage surges, such as those produced by lightning strikes, can cause large currents to flow resulting in damage to operating equipment. Electrical equipment utilizing electronics, such as a rectifier front end, are particularly susceptible to damage. As a result, transient voltage surge suppressors (TVSS) are commonly utilized to clamp the voltage level and absorb energy associated with a transient. However, analysis strongly suggests that there is a fairly high probability that equipment will be also be damaged by current surges that occur at the end of voltage sags. Furthermore, industrial studies have indicated that voltage sags are much more likely to occur than voltage surges. While TVSS devices limit the voltage applied to equipment, they do not limit the current surge experienced by electrical equipment at the end of voltage sag transients.

High inrush currents are also commonly experienced during the starting of electrical equipment. Inrush current limiting circuits, including a negative temperature coefficient (NTC) thermistor or resistor connected between a power supply and a protected load and a bypass switch in parallel with the NTC thermistor, are often used to mitigate the current surge seen by the load during starting. A NTC thermistor is a component with a resistance that decreases as its temperature increases. During startup, the temperature of the NTC thermistor is cold and its resistance is high. As operation continues, the temperature increases and the resistance of the NTC thermistor decreases, allowing more current during normal operation. Once the equipment has completed its startup or a preset time has elapsed, the bypass switch closes to remove the resistor from between the power supply and the electrical load. The current limiter circuit remains disabled until the equipment is de-energized and the bypass switch is reopened. While the inrush current limiter circuits limit the current surge during startup, these inrush current limiter circuits do not provide protection from electrical transients during normal operation of the electrical equipment.

SUMMARY

Briefly described, embodiments of this disclosure, among others, include active current surge limiters and methods of use. One exemplary system, among others, comprises a current limiter, including an interface configured to be connected between a power supply and a load; a disturbance sensor, configured to monitor the power supply for a disturbance during operation of the load; and an activator, configured to receive a control signal from the disturbance sensor and to activate the current limiter based on the control signal.

Another exemplary system, among others, comprises means for limiting current supplied to a load from a power supply; means for sensing a disturbance on the power supply during operation of the load; and means for activating the means for limiting current to the load when a disturbance is sensed.

Methods of use are also provided. One exemplary method, among others, comprises monitoring a condition of a power supply during operation of a load connected to the power supply; determining if the condition falls outside of an acceptable limit; and activating a current limiting device when the monitored condition falls outside of acceptable limits.

Other structures, systems, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Voltage sags have been shown to occur fairly frequently in industrial settings. Studies indicate that voltage sags are 100 to 1000 times more likely to occur than voltage surges. Data and analysis strongly suggest a high probability that operating equipment can be damaged by a current surge that occurs at the end of the voltage sag. The most vulnerable point for typical equipment is the end of short-duration sags, when the inrush limiting circuits are normally disabled. The current surge can have excessively high $I^2T$ ratings because the normal inrush limiting circuit (NTC thermistor or resistor+bypass switch) is disabled. The current surge causes damage to equipment, as well as degradation of components leading to shortened equipment life and premature equipment failure. Industrial, commercial and residential equipment that are potentially subject to the problem include, but are not limited to, PC's, servers, TV's, stereo amplifiers, microwave ovens, PLC's, robots, machine drives, medical equipment, etc.

Embodiments of active current surge limiters are described below. It should be emphasized that the described embodiments are merely possible examples of implementations, and are set forth for clear understanding of the principles of the present disclosure, and in no way limit the scope of the disclosure.

Figure 1:
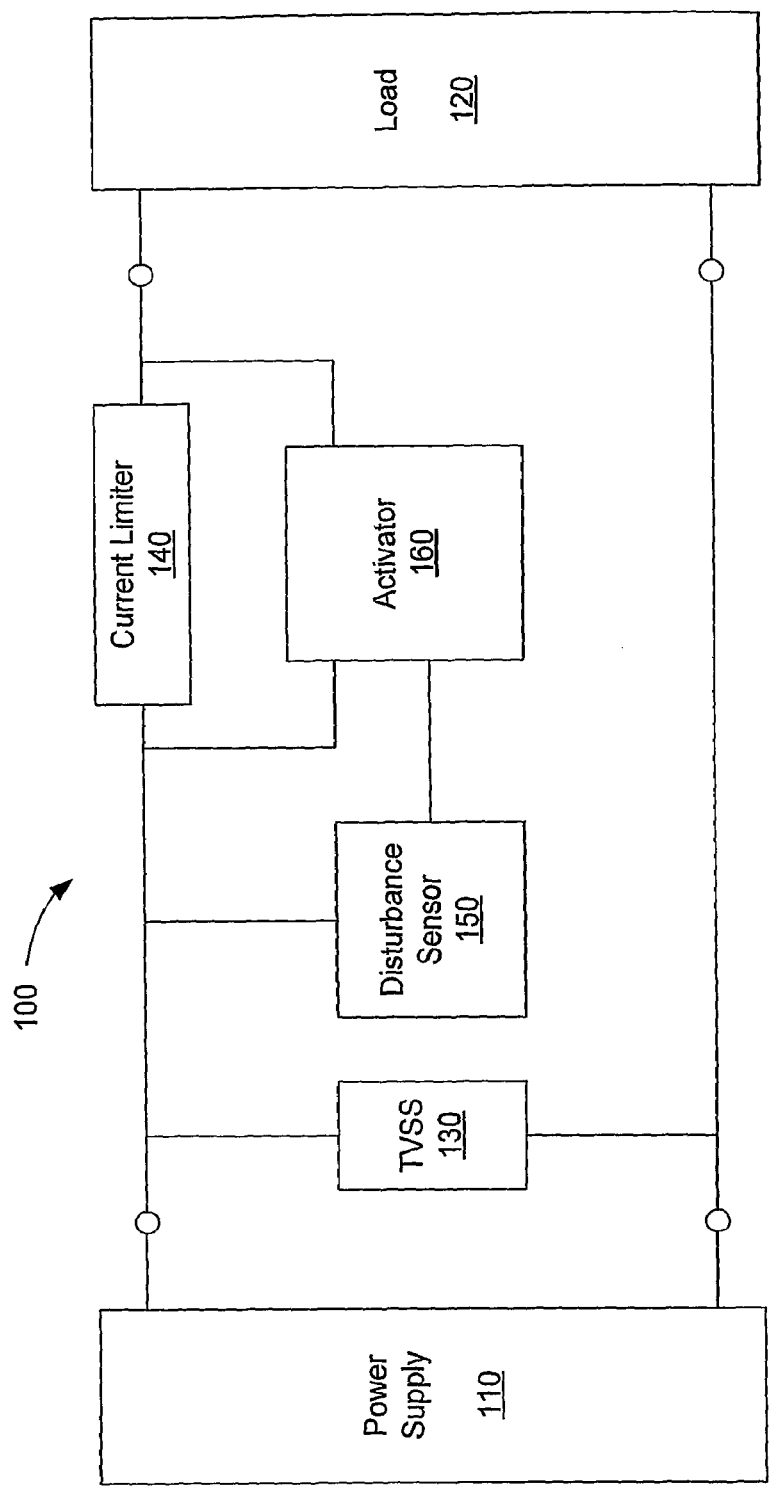
FIG. 1 illustrates an active current surge limiter.

FIG. 1 illustrates an active current surge limiter. The active current surge limiter 100 is connected at an interface between a power supply 110 and a load 120. Power supplies include AC and/or DC sources. While the principles discussed are generally applied to applications up to 1000 Volts, this does not prevent their use in applications at higher voltage levels. Loads that are sensitive to these disturbances include, but are not limited to, industrial, commercial and residential equipment that include electronic components that operate with a DC power supply. A transient voltage surge suppressor (TVSS) 130 connected on the input side can provide the added functionality of a voltage surge suppressor device. The active current surge limiter 100 includes a current limiter 140 for limiting the current supplied to the connected load 120, a disturbance sensor 150 for monitoring the condition of the power supply 110, and an activator 160 for activating the current limiter 140 when the disturbance sensor detects a disturbance on the power supply.

Disturbances in the power supply can include variations in the power supply characteristics such as, but are not limited to, the voltage, current, and combinations thereof. The presence of a power supply disturbance is indicated when the sensed characteristic falls outside established operational limits. Operational limits can be preset based on variables such as, but not limited to, industrial standards and known load and supply characteristics. However, as the power supply and load characteristics are typically unknown, establishment of allowable current limits can require additional analysis. Another alternative is to allow the disturbance sensor 150 to establish limits based on continuous monitoring of selected supply characteristics.

Figure 2:
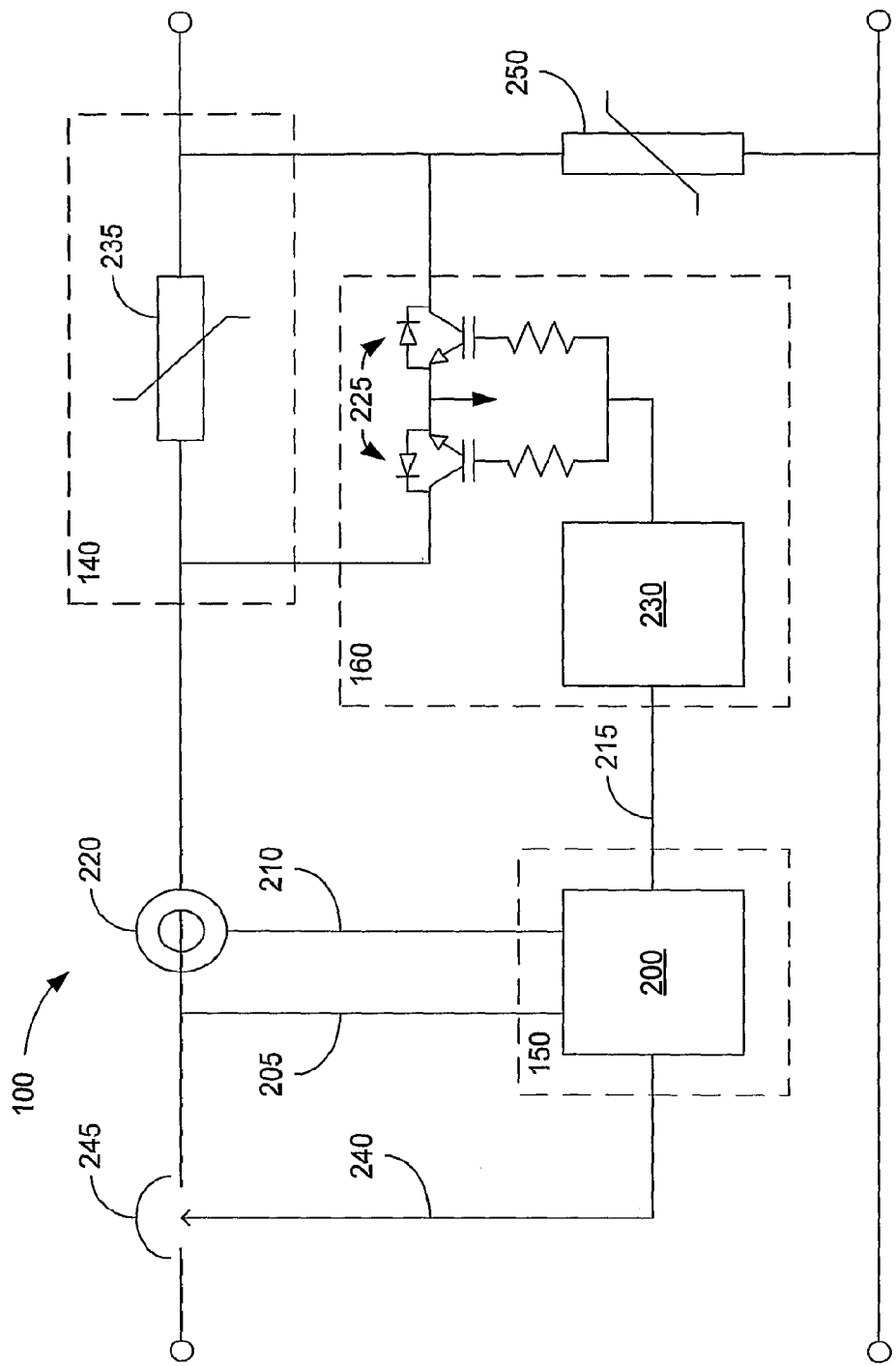
FIG. 2 is an alternative embodiment of the active current surge limiter utilizing a microcontroller and semiconductor switches.

FIG. 2 is an alternative embodiment of the active current surge limiter utilizing a microcontroller and power semiconductor switches. This non-limiting embodiment of an active current surge limiter 100, the disturbance sensor 150 uses a microprocessor or microcontroller 200 to establish allowable current limits, continuously monitor power supply characteristics (i.e. sensing voltage 205 and current 210), and communicate a control signal 215 to the activator 160 indicating the presence of a disturbance on the power supply. The described control strategy allows the active current surge limiter 100 to handle power-up and load change without problems.

To establish the allowable current limit, the circuit in FIG. 2 senses and measures the current 210 drawn by the load 120, including peak current at start-up, through a current transformer 220. The peak current at start-up is stored in a peak-rectifier circuit (not shown), including a diode and capacitor coupled with a current transformer, and measured by an A/D converter incorporated in the microcontroller 200. One skilled in the art would realize that other measurement circuits could also be utilized to measure power supply characteristics. The starting current is recorded and stored by the microcontroller 200 as a peak inrush current. During operation of the load 120, the microcontroller 200 continues to monitor the load current 210 and record any sensed peak currents.

The microcontroller 200 also monitors the incoming ac line voltage 205. Limits for the sensed voltage 205 can be preset or established by the microcontroller 200. Voltage sags occur when a supply voltage drops below a predetermined level, such as but not limited to, 90% of rated voltage for short periods of time of one half cycle or more. When a sag in the monitored line voltage 205 is detected by the microcontroller 200, a peak current limit reference ($I_{max}$) is set to the maximum peak current value thus far recorded. During a voltage sag or momentary interruption, the current drawn by the load is most likely to decrease. At the end of the voltage sag, the voltage can quickly return to normal, causing a surge in the sensed current 210. The magnitude of the surge current is affected by load factors, such as the type, condition, and proximity as well as power supply factors, such as magnitude and duration of disturbance, line impedance, return profile of the line voltage, and transformer location. Industrial, commercial and residential equipment vulnerable to the effects of current surges include, but not limited to, PC's, servers, TV's, stereo amplifiers, microwave ovens, PLC's, robots, machine drives, and medical equipment. Moreover, any equipment utilizing rectifier/capacitor circuits amplify the surge current effects when the capacitor is substantially discharged during a voltage sag.

Once the microcontroller 200 detects a current level that exceeds the $I_{max}$ threshold, a control signal 215 is sent to the activator 160 indicating the presence of a disturbance. In this non-limiting embodiment, the current limiter 140 is activated by turning off a semiconductor switch 225 through a gate drive 230. Activation of the current limiter 140 forces the load current to flow through an ac voltage clamping device 235, such as but not limited to, a varistor. The voltage impressed across the load 120 is reduced, limiting the current supplied to the load. The switch 225 can then be turned on at, but not limited to, the next cycle, a zero crossing point, and a predetermined number of switching under a high frequency duty cycle control scheme as is customary in PWM circuits. If the sensed current 210 remains high for greater than a preset period of time, such as but not limited to one to two seconds, then a trip signal 240 is activated by the microcontroller 200, opening an overload switch or circuit breaker 245 and shutting the system down until a reset is effectuated, e.g., a reset button is pressed. Incorporation of a voltage clamping device 250 provides additional voltage surge protection to the connected load 120.

The use of gate turn-off devices 225 allows turn-off and over-current protection even under normal voltage conditions as well as in the presence of fast rising current fronts that occur under fault conditions. For successful operation, the components are sized to handle trapped energy in line and load inductances. In addition, power dissipation during continuous operation should be considered during selection.

Figure 3:
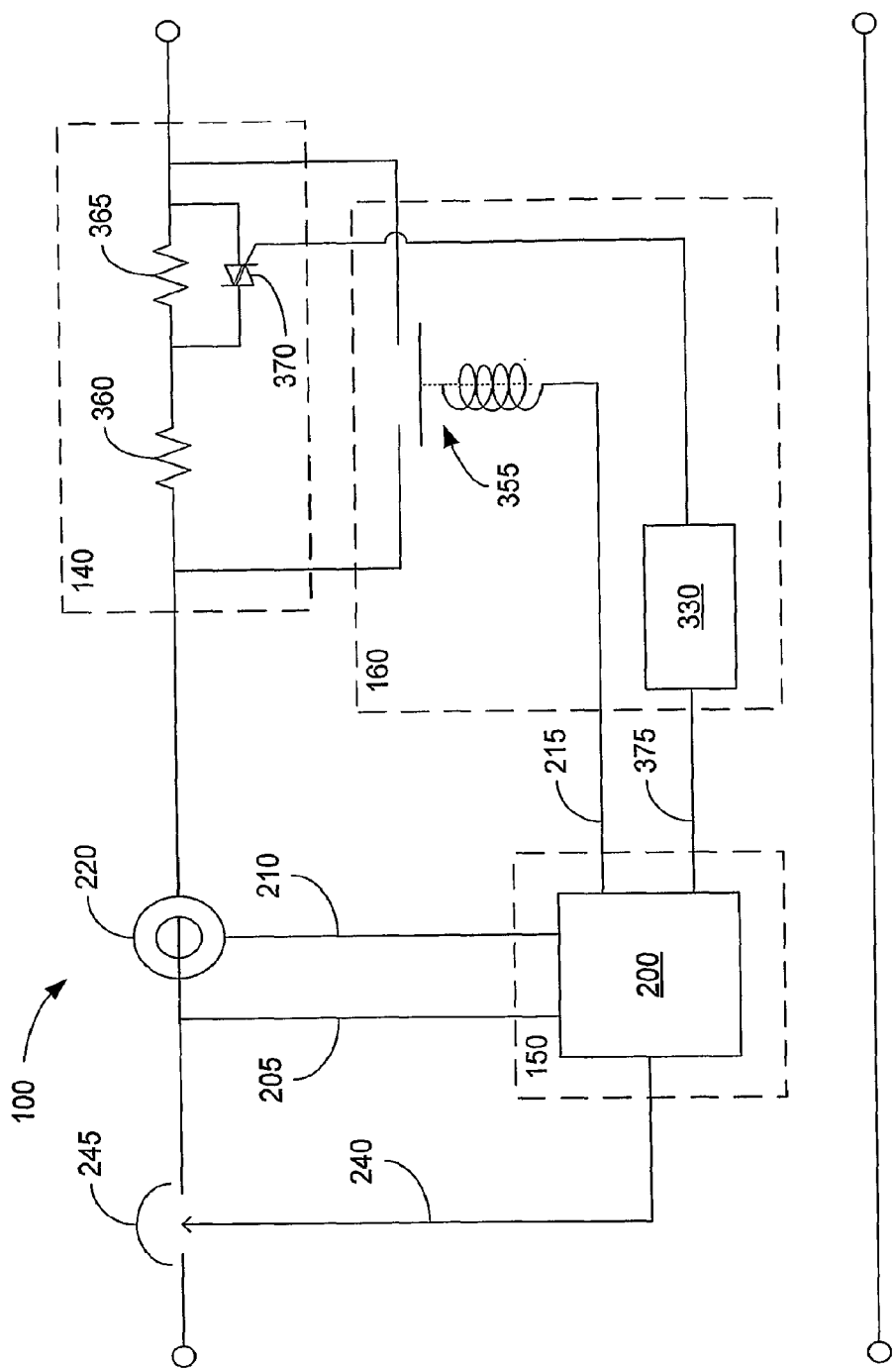
FIG. 3 is an alternative embodiment of the active current surge limiter utilizing a microcontroller and an electromechanical relay.

FIG. 3 is an alternative embodiment of the active current surge limiter utilizing a microcontroller and an electromechanical relay. This non-limiting embodiment utilizes the same disturbance sensor 150 to sense voltage 205 and current 210 as depicted in FIG. 2. During normal operation, the current limiter 140 can be bypassed using an electromechanical relay, contactor or switch. In this depiction, a control signal 215 sent by the microcontroller 200 causes a normally open relay 355 to close and deactivate the current limiter 140. The power supply is continuously monitored as described for FIG. 2.

Fast detection algorithms (e.g., as described in FIG. 6) allow the detection of supply disturbances within one quarter to one half cycle. Fast detection algorithms can be implemented in, but not limited to, software, hardware and/or individual components. Because the line current drawn by the load typically drops dramatically when the DC capacitor reverse biases the diode bridge during a voltage sag, a voltage sag that is likely to cause inrush current can be can readily detected. Upon detecting the onset of the voltage sag, the control signal 215 causes the relay 355 to open and activating the current limiter 140.

The current limiter 140 in this embodiment includes two resistors, 360 and 365, with a thyristor pair or triac 370 connected in parallel with the second resistor 365. Alternative combinations can also be utilized. Upon exceeding $I_{max}$, resistors 360 and 365 provide a high resistance to limit current to the attached load. After a sufficient time delay or a determination that the sensed current 210 is below an allowable level, the triac 370 is turned on, allowing higher current levels. Control of the triac 370 is provided by a signal 375 sent by the microcontroller 200 to a gate driver 330 for the triac 370. Once the sensed current 210 subsides or after sufficient time has elapsed, the relay 355 is reclosed allowing normal load operation to resume. As described for FIG. 2, if the sensed current 210 remains high for a predetermined period, a trip signal 240 is activated by the microcontroller 200, opening an overload switch or circuit breaker 245 and shutting the system down.

With the use of a multi-step current limiter 140, it is possible to significantly improve the performance so as to minimize impact on the load. The level of surge current that flows in the system depends on a number of parameters including, but not limited to, the depth and duration of the voltage sag, the load rating, the short circuit current available at the load point, and the amount of capacitance in the load rectifier. Monitoring of $I_{max}$ provides an indication of the load characteristics and maximum current necessary for normal operation. The current flowing through the resistors 360 and 365 forward biases the diode and provides an indication of the effective DC bus voltage ($V_{dc}$) in the load. If triac 370 is turned on at an angle α, the difference between the line and DC bus voltages ($V_{line}$-$V_{dc}$) is applied across resistor 360 and allowing an increase in current flow to the load 120. Neglecting line and load inductances, the line current decreases until, at an angle β, it reaches to zero when the line voltage equals $V_{dc}$. By controlling the turn-on of triac 370, it is possible to control the average current supplied to the load capacitance and minimize recovery time. As $V_{dc}$ increases with capacitor charging, α automatically changes to keep the line current limited and under control. Once the current drawn by load has returned to within allowable limits, the relay 355 can be closed again, allowing normal operation to resume.

This approach allows us to match the allowed inrush current to the load characteristic, as represented by $I_{max}$, and the average current drawn by the load, without requiring the use of gate turn-off devices 225. In addition, the use of triacs 370 simplifies the gating and control requirements, reducing cost and complexity. Furthermore, as the triac 370 and the resistors 360 and 365 are normally deactivated by relay 355 and only operate during transients, the power dissipation requirements are minimal, allowing packaging in a more compact form. Other combinations of resistors and switching elements, such as but not limited to triacs, can be used to control current flow.

This embodiment can also provide a soft start process for equipment without built-in startup protection. Upon power-up, a two-stage soft start process is initiated. First, resistors 360 and 365 provide a high resistance to limit inrush current. After sensed current 210 subsides to an allowable level or a preset time, triac 370 is turned on to allow higher current levels. Finally, once the current level again subsides or sufficient time has elapsed, the relay 355 is closed allowing normal load operation to begin.

Figure 4:
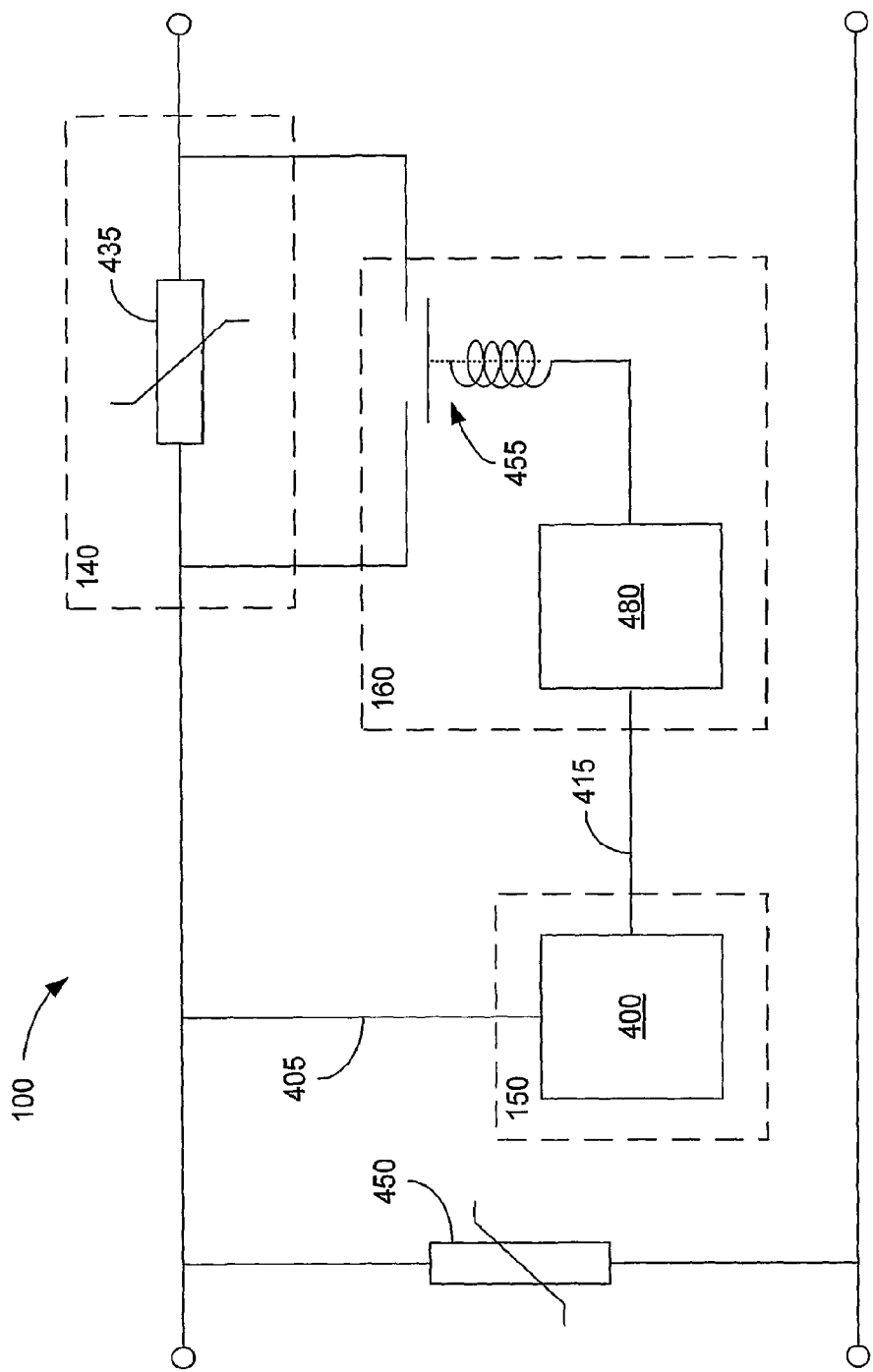
FIG. 4 is an alternative embodiment of the active current surge limiter utilizing a voltage detector and an electromechanical relay.

FIG. 4 is an alternative embodiment of the active current surge limiter utilizing a voltage detector and an electromechanical relay. In this non-limiting embodiment, a normally open relay 455 is used to activate the current limiter 140, which includes a resistor or Negative Temperature Coefficient (NTC) thermistor 435. The NTC thermistor 435 has a high resistance value when cold. The resistance drops dramatically as the NTC thermistor 435 heat up, often by a factor of 10 or more, allowing higher currents to flow. The high resistance returns as the NTC thermistor 435 cools off. Manufacturers typically specify cooling times of up to 60 seconds or more.

At startup, the relay 455 is maintained off (open) and the NTC thermistor 435 limits the inrush current that flows. As current flows, the resistance of the NTC thermistor 435 decreases providing less current limitation. After a preset time delay, the relay 455 is turned on to de-energize the current limiter 140 by bypassing the NTC thermistor 435. This allows the NTC thermistor 435 to cool down and restore the high resistance mode.

A detector circuit 400 is implemented that identifies when a voltage sag occurs, and send a control signal 415 to, activate the current limiter 140. One of many possible implementations of the detector circuit 400 utilizes a microprocessor with an A/D converter to sense and measure the line voltage 405. The microprocessor identifies when the voltage falls outside a nominally acceptable boundary defined by a preset limit. When a disturbance is detected, the detector circuit 400 sends a control signal 415 to a timer circuit 480, which causes the relay 455 to open and activate the current limiter 140. As described above, the resistance of the NTC thermistor 435 limits the surge current until the voltage is seen to return to normal conditions. After this, the NTC thermistor 435 can be bypassed after a preset time. At that point, the timer circuit 480 de-energizes the relay 455 bypassing the NTC thermistor 435. Incorporation of a voltage clamping device 450 provides additional voltage surge protection to both the connected load 120 and the active current surge limiter 100.

Figure 5:
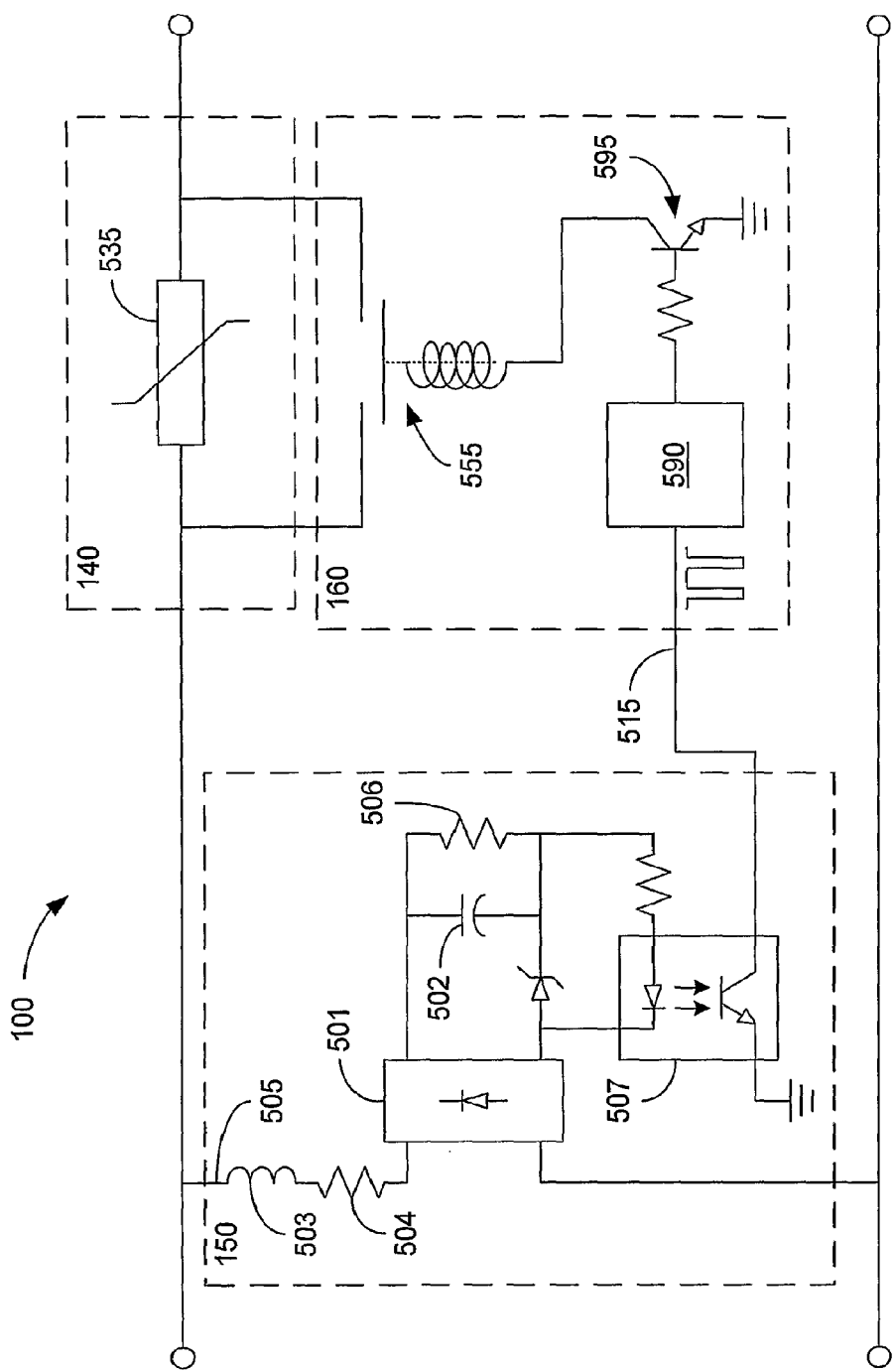
FIG. 5 is an alternative embodiment of the active current surge limiter utilizing an optocoupler and an electromechanical relay.

FIG. 5 is an alternative embodiment of the active current surge limiter utilizing an optocoupler and an electromechanical relay. This non-limiting embodiment uses a circuit for simulating the operation of a DC power supply in the disturbance sensor. The diode bridge 501 and the capacitor 502 represent a typical rectifier/capacitor circuit that may be used in a load 120. The inductance 503 and resistance 504 simulate effective line impedance. The time constant of the load resistor 506 and capacitor 502 is chosen to be similar to that found in rectifier/capacitor circuits. This circuit simulates the operation of a high power rectifier/capacitor circuit at low cost. The capacitor 502 is charged from the line at the peaks of the sensed line voltage 505, as the simulated load would. An optocoupler 507 is used to detect the charging current pulse at the line voltage peaks and send a control signal 515 to the activator 160.

A retriggerable monostable multi-vibrator 590 with an output pulse greater than one half cycle (8.33 mS) is triggered by the control signal 515 from the optocoupler 507. As long as the charging current pulses occur every half cycle, the monostable multi-vibrator 590 remains triggered. The output of the monostable multi-vibrator 590 is used to close the relay 555 through a semiconductor switch 595, such as but not limited to, a transistor. While the line voltage is within specified limits, the relay 555 is maintained closed, de-energizing the current limiter 140 by bypassing a current limiting device 535, such as but not limited to, an NTC thermistor, triac, and resistor. It should be clear to one skilled in the art that the timing and control functions could be performed by a microprocessor or microcontroller. This implementation allows for current surge limiting without a current sensor.

If the sensed voltage 505 decreases in amplitude below the simulated DC bus voltage, the charging current pulses stop, causing the optocoupler 507 to stop sending triggering pulses as the control signal 515. When the triggering pulses stop, the monostable multi-vibrator 590 output changes state at the end of the timing period, causing switch 595 to turn the relay off after a selectable delay. This then reinserts the current limiting device 535 into the circuit. When the voltage returns to normal, the current limiting device 535 limits the inrush current to the load 120. When the AC line voltage returns to normal, the charging current pulses begin again and the monostable multi-vibrator 590 is retriggered once again. After waiting for a preset time, the relay 555 is closed once again, de-energizing or bypassing the current limiter 140.

Figure 6:
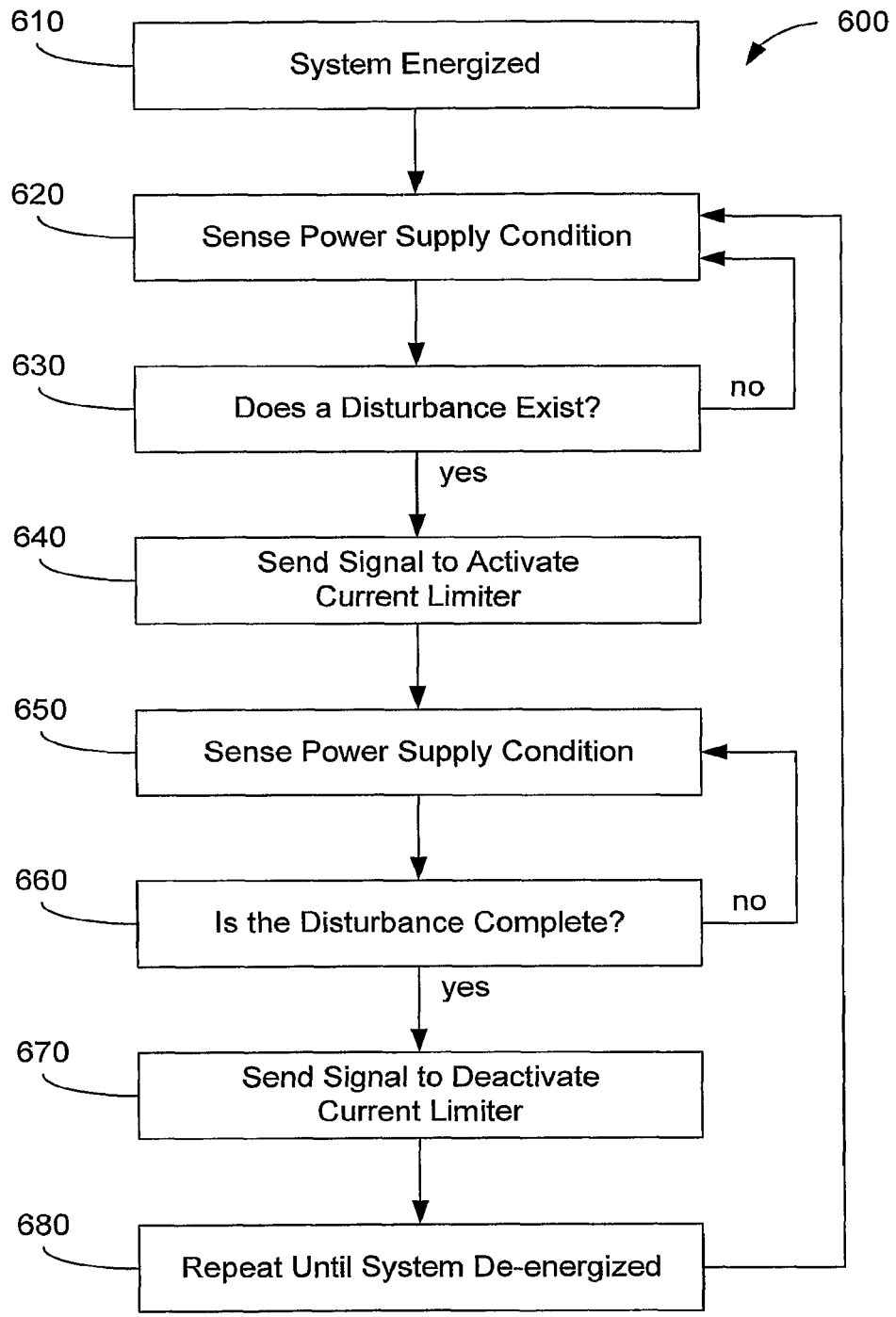
FIG. 6 is a flow chart illustrating an embodiment of a fast detection algorithm for the active current surge limiter.

FIG. 6 is a flow chart illustrating an embodiment of a fast detection algorithm 600 for the active current surge limiter. Fast detection algorithms 600 can be implemented in, but not limited to, software, hardware and/or individual components, as illustrated in the previous embodiments of FIGS. 2-5. In this non-limiting embodiment of a fast detection algorithm 600, the active current surge limiter 100 is energized (610) upon starting the connected load 120. The active current surge limiter 100 begins sensing the power supply conditions (620). This can include, but is not limited to, voltage, current, and combinations thereof. The sensed conditions are then evaluated to determine if a disturbance exists (630). If it is determined that no disturbance exists, then the active current surge limiter 100 continues to sense (620) and evaluate (630) the power supply condition. If a disturbance does exist, then the current limiter 140 is activated (640).

Once the current limiter 140 is activated, the active current surge limiter 100 returns sensing the power supply conditions (650). The sensed conditions are then evaluated to determine if the disturbance is complete (660). If it is determined that the disturbance still exists, then the active current surge limiter 100 continues to sense (650) and evaluate (660) the power supply condition. If the disturbance no longer exists, then the current limiter 140 is deactivated (670). The process repeats until the active current surge limiter 100 and its load 120 are de-energized. Appropriate time delays, as discussed above, can be incorporated to optimize system operation and protection.

It should be emphasized that the above-described embodiments of the present disclosure are merely possible examples of implementations, and are merely set forth for a clear understanding of the principles of the disclosure. Many variations and modifications may be made to the above-described embodiments for use in single or multi-phase systems. For example, a plurality of devices can be included in the current limiter to provide active of passive current limitation. In addition, a plurality of circuits utilizing integrated circuits or discrete components can be implemented to provide disturbance sensing and activation of the current limiter. Moreover, other automated methods to determine voltage and current limitations can be incorporated into active current surge limiters. All such modifications and variations are intended to be included herein within the scope of this disclosure and protected by the following claims.

Therefore, at least the following is claimed:

1. An active current surge limiting apparatus for reduction of inrush current to an electrical load in response to detection of a disturbance in an input AC power supply coupled to the electrical load, comprising:
   a current-limiting circuit coupled between the input power supply and the electrical load, the current-limiting circuit comprising a parallel arrangement of (a) current limiter and (b) a relay having contacts that are in a normally-open position at start-up and a closed position in response to a relay control signal that couples the input power supply to the electrical load and bypasses the current limiter;
   an AC voltage peak detector circuit for providing a control signal when the value of the input AC power exceeds a predetermined voltage level; and
   a retriggerable pulse circuit responsive to the control signal from the AC voltage peak detector circuit for providing the relay control signal having a predetermined nominal duration, such that the relay is maintained in the closed position so long as the input AC power exceeds the predetermined voltage level on each cycle of a predetermined number of AC cycles,
   whereby the current limiter provides an impedance for reduction of inrush current to the electrical load upon startup and upon opening of the relay in response to expiration of the relay control signal and is bypassed upon closing of the relay.

2. The apparatus of claim 1, wherein the current limiter comprises a negative temperature coefficient (NTC) component.

3. The apparatus of claim 1, further discloses wherein the AC voltage peak detector comprises an isolator.

4. The apparatus of claim 3, wherein the isolator comprises an optocoupler.

5. The apparatus of claim 1, wherein the peak detector circuit comprises a resistor-capacitor (RC) circuit that charges when the input AC power exceeds the predetermined voltage level and discharges when the input AC power is less than the predetermined voltage level, and wherein the control signal is a pulse that begins when the capacitor is charged to a first predetermined level and ends when the capacitor discharges to a second predetermined level.

6. The apparatus of claim 5, wherein the predetermined voltage level of the input AC power is selected to a value that maintains the charge on the capacitor of the RC circuit for a duration that exceeds the duration of the relay control signal.

7. The apparatus of claim 5, wherein the values of the RC circuit are selected to provide a time constant that is similar to the time constant of the RC characteristics of the electrical load.

8. The apparatus of claim 1, wherein the control signal comprises a pulse having a duration that begins when the input AC power voltage exceeds the predetermined voltage level and ends when the AC power voltage is less than the predetermined voltage level.

9. The apparatus of claim 1, wherein the AC voltage peak detector circuit comprises:
   a diode bridge for rectifying the input AC power and providing a rectified power signal; and
   a resistor-capacitor (RC) circuit operative to charge when the rectified power signal exceeds the predetermined voltage level and discharge when the rectified power signal is less than the predetermined voltage level, thereby providing a charging current pulse; and
   an optoisolator for isolating the charging current pulse and providing the control signal.

10. The apparatus of claim 9, further comprising a line impedance simulator circuit coupled to the diode bridge,
   whereby the line impedance simulator circuit and the RC circuit simulate the electrical characteristics of the electrical load.

11. The apparatus of claim 9, wherein the control signal is a pulse that begins when the capacitor is charged to a first predetermined level and ends when the capacitor discharges to a second predetermined level.

12. The apparatus of claim 1, further comprising line impedance simulator circuit coupled to the AC voltage peak detector circuit.

13. The apparatus of claim 1, wherein the retriggerable pulse circuit comprises a retriggerable monostable multivibrator.

14. The apparatus of claim 1, wherein the relay control signal comprises a pulse of nominal duration of about 8.33 mS, and wherein the relay control signal is maintained at a value that keeps the relay in the closed position so long as the AC voltage peak detector circuit provides the control signal.

15. The apparatus of claim 1, further comprising a semiconductor switch that is turned on by the relay control signal so as to maintain the relay in the closed position so long as the relay control signal is maintained.

16. The apparatus of claim 1, wherein the retriggerable pulse circuit controls activation of the coil of the relay by maintaining the contacts in the closed position during provision of the control signal from the AC voltage peak detector, and
   wherein the control signal from the AC voltage peak detector comprises signal pulses that correspond to the cycles of AC power from the input power supply, the signal pulses operative to retrigger the retriggerable pulse circuit during normal conditions on the input power supply and maintain the relay contacts closed,
   whereby the relay contacts open if the signal pulses are not provided to retrigger the retriggerable pulse circuit.

17. The apparatus of claim 1, wherein the apparatus is coupled to a reactive load, and wherein the circuit maintains the relay in an open position during an initial startup condition of power being provided from the input power supply, and further comprising a timer circuit operative to place the relay in the closed position after expiration of a predetermined time period after the startup condition.

18. The apparatus of claim 17, wherein the timer circuit comprises an inductor and resistor for simulating the startup characteristics of the electrical load and an resistor-capacitor (RC) circuit.

19. The apparatus of claim 1, wherein the disturbance is a voltage sag that results in the AC voltage peak detector not providing the control signal due to the input AC power not reaching the predetermined voltage level for a period of time.

20. The apparatus of claim 1, wherein the disturbance comprises sufficient variations in the voltage or current of the input AC power supply.

21. A method for reducing inrush current to an electrical load in response to detection of a disturbance in an input AC power supply coupled to the electrical load, comprising the steps of:
   providing a current-limiting circuit coupled between the input power supply and the electrical load, the current-limiting circuit comprising a parallel arrangement of (a) current limiter and (b) a relay having contacts that are in a normally-open position at start-up and a closed position in response to a relay control signal that couples the input power supply to the electrical load and bypasses the current limiter;
   providing a control signal when the value of the input AC power exceeds a predetermined voltage level; and
   repeatedly generating the relay control signal with a predetermined nominal duration in response to each occurrence of the control signal such that the relay is maintained in the closed position so long as the input AC power exceeds the predetermined voltage level,
   whereby the current limiter provides an impedance for reduction of inrush current to the electrical load upon startup and upon opening of the relay in response to expiration of the relay control signal and is bypassed upon closing of the relay.

22. The method of claim 21, wherein the current limiter comprises a negative temperature coefficient (NTC) component.

23. The method of claim 21, wherein the relay control signal is provided by a retriggerable pulse circuit.

24. The method of claim 23, wherein the retriggerable pulse circuit comprises a retriggerable monostable multivibrator.

25. The method of claim 23, further comprising the step of isolating the control signal from the retriggerable pulse circuit with an optoisolator.

26. The method of claim 21, wherein the control signal is provided from a peak detector circuit comprising a resistor-capacitor (RC) circuit that charges when the input AC power exceeds the predetermined voltage level and discharges when the input AC power is less than the predetermined voltage level, and wherein the control signal is a pulse that begins when the capacitor is charged to a first predetermined level and ends when the capacitor discharges to a second predetermined level.

27. The method of claim 26, wherein the predetermined voltage level of the input AC power is selected to a value that maintains the charge on the capacitor of the RC circuit for a duration that exceeds the duration of the relay control signal.

28. The method of claim 26, wherein the values of the RC circuit are selected to provide a time constant that is similar to the time constant of the RC characteristics of the electrical load.

29. The method of claim 21, wherein the control signal comprises a pulse having a duration that begins when the input AC power voltage exceeds the predetermined voltage level and ends when the AC power voltage is less than the predetermined voltage level.

30. The method of claim 21, further comprising the steps of:
   rectifying the input AC power to providing a rectified power signal; and charging a capacitor of a resistor-capacitor (RC) circuit when the rectified power signal exceeds the predetermined voltage level discharging the capacitor of the RC circuit when the rectified power signal is less than the predetermined voltage level, thereby providing a charging current pulse; and isolating the charging current pulse to provide the control signal.

31. The method of claim 30, further comprising the step of simulating the line impedance with a line impedance simulator circuit coupled to the diode bridge, whereby the line impedance simulator circuit and the RC circuit simulate the electrical characteristics of the electrical load.

32. The method of claim 30, wherein the control signal is a pulse that begins when the capacitor is charged to a first predetermined level and ends when the capacitor discharges to a second predetermined level.

33. The method of claim 21, wherein the relay control signal comprises a pulse of nominal duration of about 8.33 mS, and wherein the relay control signal is maintained at a value that keeps the relay in the closed position so long as the AC voltage peak detector circuit provides the control signal.

34. The method of claim 21, further comprising the step of maintaining the relay in the closed position so long as the relay control signal is maintained in a predetermined state.

35. The method of claim 21, wherein the relay is actuated by a semiconductor switch that is turned on by the relay control signal so as to maintain the relay in the closed position so long as the relay control signal is maintained.

36. The method of claim 21, wherein the control signal comprises signal pulses that correspond to the cycles of AC power from the input power supply, the signal pulses operative to retrigger a retriggerable pulse circuit during normal conditions on the input power supply, and further comprising the step of: maintaining the contacts in the closed position during provision of the control signal, whereby the relay contacts open if the signal pulses are not provided to retrigger the retriggerable pulse circuit.

37. The method of claim 21, wherein the method is carried out in a circuit coupled prior to a reactive load, and further comprising the steps of: maintaining the relay in an open position during an initial startup condition of power being provided from the input power supply, and placing the relay in the closed position after expiration of a predetermined time period after the startup condition.

38. The method of claim 37, further comprising the step of timing the predetermined time period after the startup condition with a timer circuit.

39. The method of claim 38, wherein the timer circuit comprises an inductor and resistor for simulating the startup characteristics of the electrical load and an resistor-capacitor (RC) circuit.

* * * * *